United States Patent [19]

Nakamura

[11] 4,352,257
[45] Oct. 5, 1982

[54] SLIDING WINDOW FOR VEHICLES

[75] Inventor: Shunichi Nakamura, Anjo, Japan

[73] Assignee: Aisin Seiki Kabushiki Kaisha, Aichi, Japan

[21] Appl. No.: 116,416

[22] Filed: Jan. 29, 1980

[30] Foreign Application Priority Data

Feb. 8, 1979 [JP] Japan ................................. 54-13963

[51] Int. Cl.³ ............................................. E06B 3/32
[52] U.S. Cl. ...................................................... 49/406
[58] Field of Search .................................. 49/406, 458

[56] References Cited

U.S. PATENT DOCUMENTS

| | | | |
|---|---|---|---|
| 3,432,966 | 3/1969 | Bordner | 49/458 X |
| 3,566,950 | 3/1971 | Collins et al. | 49/406 X |
| 4,064,653 | 12/1977 | Randall et al. | 49/458 |
| 4,112,623 | 9/1978 | McPherson | 49/406 X |

Primary Examiner—Philip C. Kannan
Attorney, Agent, or Firm—Sughrue, Mion, Zinn, Macpeak & Seas

[57] ABSTRACT

Two overlapping laterally slidable windows in a main frame are separated by a vertically disposed sash bar having weather stripping on opposite surfaces thereof. A U-shaped edge frame is secured to each of the vertically extending overlapping window edges with the leg portions of the edge frames disposed between said windows being spaced from each window. The opposite vertically extending end surfaces of said sash bar are provided with vertically extending beveled grooves adapted to receive and retain the spaced legs of the U-shaped edge frames when the windows are moved to the closed position within the main frame.

3 Claims, 1 Drawing Figure

U.S. Patent     Oct. 5, 1982     4,352,257
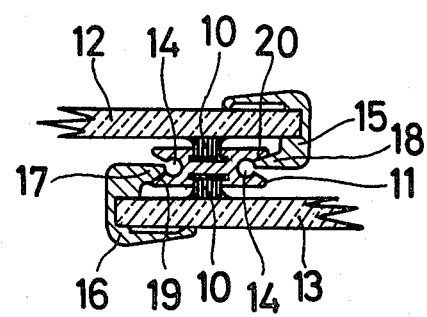

SLIDING WINDOW FOR VEHICLES

BACKGROUND OF THE INVENTION

1. Field of the Invention

The present invention relates to a sliding window arrangement for vehicles and more particularly to an arrangement for holding said windows in sealed overlapping relation when closed.

2. Prior Art

In conventional sliding windows for vehicles, two laterally displaceable sliding windows are mounted in a main frame adapted to be secured to the vehicle body. The overlapping portions of the sliding windows are apt to be spaced apart by the vibration of the vehicle while running, especially in those cases where the height of the window is relatively high. As a result of this spacing, the sealing function for the windows is compromised and the efficiency of the heating and cooling of the interior of the vehicle is substantially decreased. Furthermore, it is possible for water to leak through the spaced apart windows into the interior of the vehicle.

SUMMARY OF THE INVENTION

The sliding window arrangement according to the present invention provides sliding windows for vehicles which obviate all of the aforementioned problems related to prior art sliding window arrangements.

The sliding window arrangement according to the present invention prevents the overlapping portions of two closed windows from separating due to vibrations during running of the vehicle while still providing a sliding window arrangement which can be opened and closed easily and smoothly.

The sliding window arrangement according to the present invention is comprised of a vertically disposed sash bar disposed between the two overlapping windows with weather stripping on opposite side surfaces thereof for sliding engagement with the windows, a vertically disposed beveled groove is located in each of the two opposed end edges of the sash bar and a U-shaped edge frame is secured to the vertically extending edge of each of the slidable windows, each U-shaped edge frame having the leg thereof intermediate said windows being spaced from said windows for engagement with a beveled groove in said sash bar to hold said windows in firm engagement with said weather stripping when closed.

The foregoing and other objects, features and advantages of the invention will be apparent from the following more particular description of a preferred embodiment of the invention as illustrated in the accompanying drawing.

BRIEF DESCRIPTION OF THE DRAWING

The FIGURE is a horizontal sectional view of a preferred embodiment of a sliding window arrangement for vehicles according to the present invention showing the windows in their closed, overlapped condition.

DETAILED DESCRIPTION OF THE INVENTION

The two windows 12 and 13 shown in the FIGURE are each slidably mounted in a conventional main frame (not shown) for sliding movement left and right as viewed in the FIGURE. A sash bar 11 is disposed between the two overlapping windows 12 and 13 and extends vertically between the top and bottom edges of the main frame. The sash bar 11 is adapted to be secured to the top and bottom edges of the main frame by means of screws extending through the main frame into the openings 14. A pair of weather strips 10, 10 are secured to the opposed longitudinal side surfaces of the sash bar 11 by any suitable means. The weather strips 10, 10 are disposed in sliding engagement with the windows 12 and 13.

The overlapping end edges of the windows 12 and 13 are provided with edge frames 15 and 16, respectively. The edge frames 15 and 16 may be made of metal or plastic and are secured to the vertical edges of the windows by any suitable means such as adhesives or the like. The edge frames 15 and 16 have a generally U-shaped cross-sectional configuration with the legs 17 and 18 which are located between the two overlapping windows being spaced from the two windows. A pair of beveled grooves 19 and 20 are formed in the vertically disposed end surfaces of the sash bar respectively and intersect the bores 14, 14. The inner surfaces of the legs 17 and 18 are also beveled for complimentary engagement with the beveled grooves 19 and 20, respectively. Thus, when the windows 12 and 13 are moved to their closed positions as illustrated in the FIGURE, the beveled surfaces of legs 17 and 18 will engage the beveled surfaces 19 and 20 on the sash bar to firmly hold the windows 12 and 13 against the weather strips 10, 10.

The contact of the windows 12 and 13 with the weather strips 10, 10 during sliding provides for a smooth, quiet operation. Furthermore, the firm engagement of the windows 12 and 13 with the weather strips 10, 10 due to the engagement of the beveled surfaces will prevent rattling when the windows are closed and the vehicle is in motion and will also provide an extremely efficient seal to completely eliminate the passage of drafts and moisture between the overlapping portions of the sliding windows.

While the invention has been described with reference to two sliding windows, it is obvious that one or the other of the two windows 12 and 13 could be fixed and that the sash bar and edge frame sealing arrangement would also be effective with a single sliding window.

Obviously, many modifications and variations of the present invention are possible in light of the above teachings. It is, therefore, to be understood that within the scope of the appended claims, the invention may be practiced otherwise than as specifically described herein.

What is claimed is:

1. A sliding window arrangement comprising two overlapping sliding windows adapted to be guided for movement in a main frame, a sash bar disposed between the overlapping portions of the two windows and extending parallel to the edges of the overlapping window portions, weather-strip means on opposite side surfaces of said sash bar in engagement with said windows and edge frame means secured to the edges of each overlapping window portion, said edge frame means and said sash bar having complimentary beveled engaging means for firmly holding each window against said weather-strip means when said windows are in the closed position, said complimentary beveled engaging means being comprised of two oppositely extending pairs of spaced projections on said sash bar and a projecting leg on said edge frame means on each window adapted to engage a respective projection on said sash bar, said space between each pair of projections defining a pair of apertures extending the entire length of the sash bar to provide holes at opposite ends thereof for receiving screws for securing said sash bar to said main frame.

2. A sliding window arrangement as set forth in claim 1, wherein said edge frame means is made of metal.

3. A sliding window arrangement as set forth in claim 1, wherein said edge frame means is made of plastics.